United States Patent
Chikkala et al.

(10) Patent No.: US 11,665,538 B2
(45) Date of Patent: May 30, 2023

(54) SYSTEM FOR EMBEDDING AN IDENTIFICATION CODE IN A PHONE CALL VIA AN INAUDIBLE SIGNAL

(71) Applicant: International Business Machines Corporation, Armonk, NY (US)

(72) Inventors: Ravithej Chikkala, Austin, TX (US); Su Liu, Austin, TX (US); Hamid Majdabadi, Ottawa (CA); Manjunath Ravi, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 16/572,014

(22) Filed: Sep. 16, 2019

(65) Prior Publication Data
US 2021/0084490 A1     Mar. 18, 2021

(51) Int. Cl.
| | |
|---|---|
| H04L 9/08 | (2006.01) |
| H04W 12/037 | (2021.01) |
| H04L 9/40 | (2022.01) |
| H04W 12/40 | (2021.01) |

(52) U.S. Cl.
CPC ......... *H04W 12/037* (2021.01); *H04L 9/0866* (2013.01); *H04L 63/0428* (2013.01); *H04L 63/0876* (2013.01); *H04W 12/40* (2021.01)

(58) Field of Classification Search
CPC .. H04W 12/037; H04W 12/40; H04L 9/0866; H04L 63/0428; H04L 63/0876
See application file for complete search history.

(56) References Cited

U.S. PATENT DOCUMENTS

| | | | |
|---|---|---|---|
| 4,814,552 A | 3/1989 | Stefik et al. | |
| 5,822,360 A * | 10/1998 | Lee | G10L 19/018 |
| | | | 375/140 |
| 5,905,800 A * | 5/1999 | Moskowitz | G06T 1/0085 |
| | | | 380/28 |

(Continued)

FOREIGN PATENT DOCUMENTS

| | | |
|---|---|---|
| CN | 201118718 Y | 9/2008 |
| CN | 101374181 A | 2/2009 |
| EP | 3343245 A1 | 7/2018 |

OTHER PUBLICATIONS

Detection of Stolen Mobile Devices An IP.com Prior Art Database Technical Disclosure Authors et. al.: Disclosed Anonymously IP.com No. IPCOM000226492D IP.com Electronic Publication Date: Apr. 8, 2013 (Year: 2013).*

(Continued)

*Primary Examiner* — Trang T Doan
(74) *Attorney, Agent, or Firm* — Troutman Pepper Hamilton Sanders LLP

(57) ABSTRACT

A system for transmitting an identification code in a telecommunications system via a mobile device. The mobile device includes a component to generate embed an identification code by generating an inaudible signal. The inaudible signal is either ultrasonic or infrasonic. The mobile device also generates an audible signal based on information received from a microphone associated with the mobile device, merges the inaudible signal with the audible signal to produce a combined signal, and transmits the combined signal from the mobile device to the other device via the wireless network.

14 Claims, 7 Drawing Sheets

(56) References Cited

U.S. PATENT DOCUMENTS

| | | | |
|---|---|---|---|
| 6,737,957 B1* | 5/2004 | Petrovic | G10L 19/018 340/5.86 |
| 7,461,256 B2* | 12/2008 | Tachibana | G06T 1/0028 380/210 |
| 8,462,950 B2* | 6/2013 | Jacobs | G06Q 30/0601 713/176 |
| 8,838,967 B1 | 9/2014 | Mills et al. | |
| 8,879,986 B2* | 11/2014 | Fisher | G06Q 20/3272 455/556.1 |
| 9,412,120 B1* | 8/2016 | Bitoun | H04W 4/023 |
| 9,461,992 B2 | 10/2016 | Outwater et al. | |
| 11,233,582 B2* | 1/2022 | Knauer | H04L 65/612 |
| 2003/0189488 A1 | 10/2003 | Forcier et al. | |
| 2003/0212549 A1 | 11/2003 | Steentra et al. | |
| 2007/0149114 A1* | 6/2007 | Danilenko | H04H 60/27 455/3.06 |
| 2011/0178799 A1 | 7/2011 | Allen et al. | |
| 2014/0112102 A1 | 4/2014 | Calvarese | |
| 2014/0160880 A1 | 6/2014 | King et al. | |
| 2014/0373184 A1* | 12/2014 | Mahaffey | G06F 21/88 726/35 |
| 2015/0185311 A1* | 7/2015 | Lohier | G06F 21/88 367/118 |
| 2015/0309151 A1* | 10/2015 | Shibata | H04L 9/00 713/150 |
| 2016/0104145 A1* | 4/2016 | Critchley | H04W 12/02 705/41 |
| 2016/0182657 A1 | 6/2016 | Mukherjee et al. | |
| 2017/0019525 A1 | 1/2017 | Hannon et al. | |
| 2017/0150348 A1* | 5/2017 | Kowalevicz | H04L 9/0869 |
| 2018/0224864 A1* | 8/2018 | Kline | G05D 1/0259 |
| 2019/0043471 A1* | 2/2019 | Maziewski | H04K 3/00 |
| 2020/0090206 A1* | 3/2020 | Park | G05D 1/101 |
| 2020/0176003 A1* | 6/2020 | Magdina | H04L 63/123 |
| 2020/0314247 A1* | 10/2020 | Klingler | H04M 3/54 |

OTHER PUBLICATIONS

Faizan Shaikh, "Getting Started with Audio Data Analysis Using Deep Learning," Analytics Vidhya, Aug. 24, 2017. Retrieved from the Internet: URL: https://www.analyticsvidhya.com/blog/2017/08/audio-voice-processing-deep-learning/ [retrieved on Sep. 16, 2019].

* cited by examiner

SYSTEM FOR EMBEDDING AN IDENTIFICATION CODE IN A PHONE CALL VIA AN INAUDIBLE SIGNAL

TECHNICAL FIELD

The present application relates generally to data encryption for communications and, more particularly, to systems and methods for embedding an identification code in a phone call via an inaudible signal.

BACKGROUND

With the proliferation of mobile devices such as cell phones and smart phones, it is simpler than ever for anyone to contact multiple people quickly and easily. As a result, we are bombarded by unwanted calls, such as calls from scammers, telemarketers, and other similar sources. Moreover, while there are some safeguards for tracking lost and stolen devices, there is no ideal system for tracking or identifying when missing phones make and receive calls, which could be useful in finding these devices. The present disclosure is directed to addressing and overcoming these and other problems of the prior art.

SUMMARY

According to some embodiments, a computer-implemented method for transmitting an identification code in a telecommunications system via a data processing system in a mobile device connected to a wireless network is disclosed. The mobile device includes a processing device and a memory comprising instructions which are executed by the processor. The method includes collecting identification information, generating an identification code based on the identification information, encrypting the identification code, generating an inaudible signal for the encrypted identification code, connecting a telecommunications call between the mobile device and another device, generating an audible signal based on information received from a microphone associated with the mobile device, merging the inaudible signal with the audible signal to produce a combined signal, and transmitting the combined signal from the mobile device to the other device via the wireless network. The inaudible signal is ultrasonic or infrasonic.

According to some embodiments, another computer-implemented method for transmitting an identification code in a telecommunications system via a data processing system in a mobile device connected to a wireless network is disclosed. The mobile device includes a processing device and a memory comprising instructions which are executed by the processor. The method includes connecting a telecommunications call between the mobile device and a sending mobile device, receiving an inaudible signal from the sending mobile device as part of the telecommunications call, decrypting the inaudible signal to determine an identification code embedded in the signal, and providing an alert to the decrypted identification code. The inaudible signal is ultrasonic or infrasonic.

According to some embodiments, a mobile device configured to connect to a wireless network to conduct a telecommunications call with a receiving mobile device is disclosed. The mobile device includes a EUDCIC manager configured to decrypt a received identification number in an inaudible signal, and input/output devices for facilitating the telecommunications call, comprising a microphone, a speaker, and a user interface. The identification number is associated with a sending mobile device for determining information about the sending mobile device, and the EUDCIC manager is configured to display an alert via the user interface based on the decrypted identification number. The inaudible signal is ultrasonic or infrasonic.

Additional features and advantages are apparent from the following detailed description that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF ILLUSTRATIVE EMBODIMENTS

Figure 1:
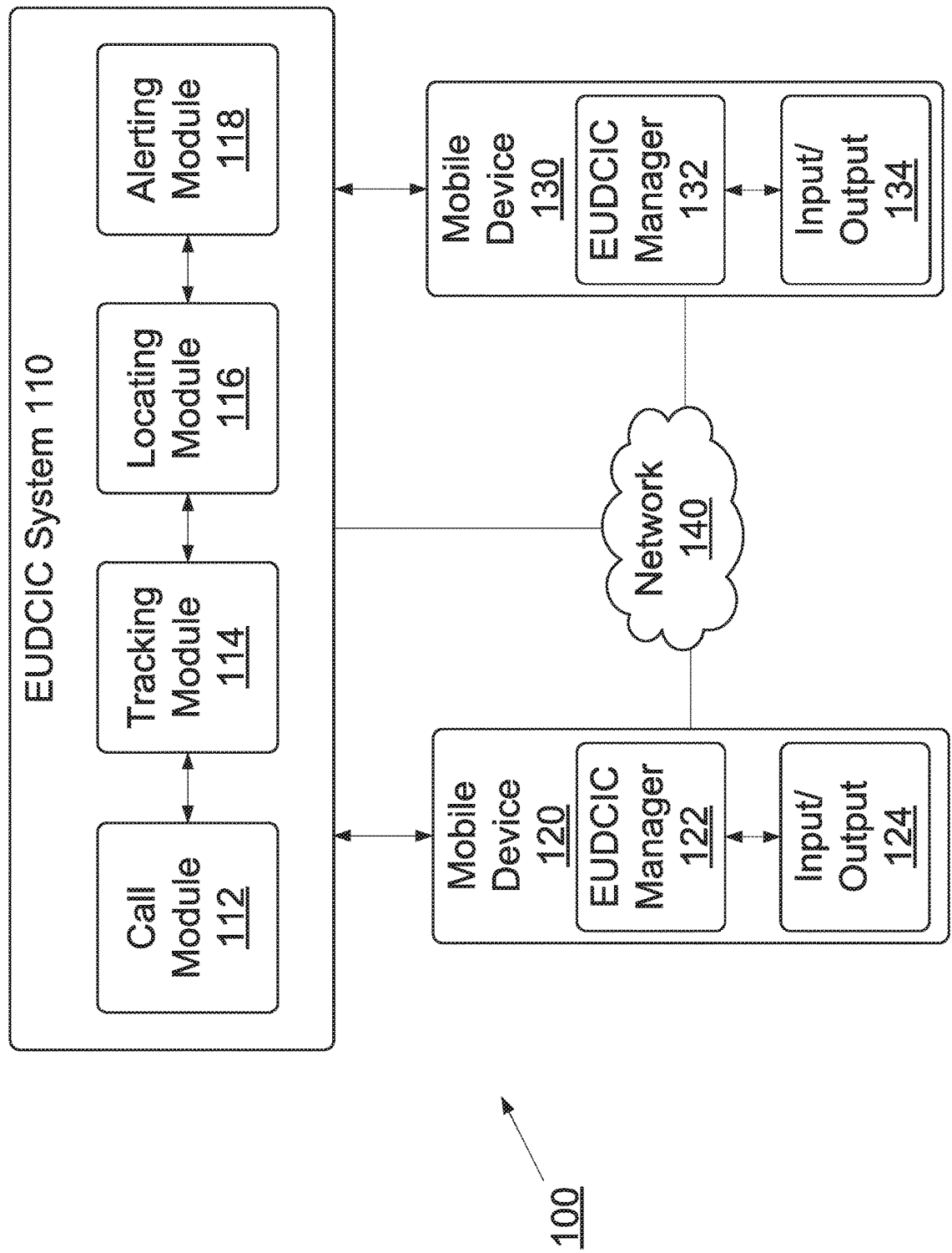
FIG. 1 depicts a block diagram of an exemplary telecommunications system, consistent with disclosed embodiments.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure relates to systems and methods for using an Embedded Ultrasound Device Calling Identification Code ("EUDCIC" or "identification code"). For example, embodiments include a system for mobile device communication (e.g., cell phone calls) that includes an inaudible signal merged with an audio signal to deliver an identification code as part of the call. The inaudible signal is an ultrasonic signal with a frequency higher than the upper audible limit of human hearing. In alternative embodiments, an infrasonic signal may be used in place of the ultrasonic signal, the infrasonic signal being a waveform with a frequency lower than the lower audible limit of human hearing.

In an embodiment, the identification code can be defined as a unique incoming call information code for classifying and identifying a caller and caller device information. By using the identification code, the receiving device can at least identify one of caller's information (e.g., caller's name, device, location, or any other calling context). The receiving device may receive the identification code and perform a process to decrypt the code and determine information about the sending device, such as whether the sending device is associated with a telemarketing or fraudulent entity, whether the sending device has been reported as stolen, etc.

FIG. 1 is an illustration of a telecommunications system 100 that includes a EUDCIC system 110 and a plurality of mobile devices, including mobile device 120 and mobile device 130, connected by a network 140. The telecommunications system 100 may be associated with a call network or service provider, such as a telecommunications company. In another embodiment, the telecommunications system 100 may be associated with a tracking entity for monitoring telecommunications systems.

The EUDCIC system 110 may be a computing device, such as a back-end server. For example, the EUDCIC system 110 may be a computing device associated with a telecommunications company for providing mobile communications services. In other embodiments, the EUDCIC system 110 may be a mobile device on a telecommunications network. The EUDCIC system 110 may include components that enable disclosed functions, including identifying call data, tracking call data, locating mobile devices, and alerting to information on the basis of other functions and results. The EUDCIC system 110 may include one or more interconnected computing devices having processing and/or storage elements.

The EUDCIC system 110 may include one or more of a call module 112, a tracking module 114, a locating module 116, and an alerting module 118. The modules 112-118 may be configured to provide communications functions, such as facilitating a mobile phone call between user devices 120, 130. The modules 112-118 may additionally or alternatively be configured to receive EUDCIC information to provide EUDCIC services, such as identification services, locating services, alerting services, etc. These modules 112-118 may be embodied by hardware and/or software and may be combined, separated into additional modules, or a combination of these. For example, the modules 112-118 may be a suite of software engines stored in a memory device and configured to be executed by a hardware processor for providing one or more functions disclosed herein.

The call module 112 may be a hardware and/or software component configured to receive call data related to a call between two devices, such as mobile device 120 and 130. For instance, the call module 112 may be configured to receive phone number, call duration, network information, etc. related to a call. The call module 112 may also be configured to receive identification codes associated with EUDCIC. For example, the call module 112 may receive an identification code associated with mobile device 120 and/or an identification code associated with mobile device 130 as a result of the call between the devices. In some embodiments, the EUDCIC system 110 may communicate with a user via the call module 112. For example, The tracking module 114 may be a hardware and/or software component configured to track information associated with users and mobile devices. For example, the tracking module 114 may be configured to maintain an updated list of identification codes and users associated with those identification codes. The tracking module 114 may also store information received from a user such as information associated with lost, missing, or stolen mobile devices and identification codes, and information associated with telemarketing entities, fraudulent entities, and the like, and associated identification codes. For instance, the tracking module 114 may maintain a database of mobile device International Mobile Equipment Identity (IMEI) codes, users associated with those codes, and any alerts or flags such as stolen device, fraudulent entity, etc.

The locating module 116 may be a hardware and/or software component configured to perform one or more locating processes for determining the location of a mobile device, such as mobile device 120 or 130. In one embodiment, the locating module 116 is configured to perform a locating function using an identification code, such as an IMEI code of a mobile device. For instance, the locating module 116 may use cellular data locating techniques to determine an approximate location of a mobile device. In other embodiments, the locating module 116 may be configured to use GPS data from a GPS locater to determine a location, such as the location of a mobile device associated with the GPS locater.

The alerting module 118 may be a hardware and/or software component configured to perform one or more alerting functions associated with the EUDCIC system 110. For example, the alerting module 118 may send a message to a mobile device (e.g., mobile device 120, 130) based on a result of another EUDCIC function. For example, after a EUDCIC is received as a result of a call between mobile device 120 and 130, the EUDCIC system 110 may control the alerting module 118 to provide an alert to the mobile device 120 regarding the mobile device 130, such as information indicating that the call or user is suspicious.

The mobile device 120 may be a computing device with cellular calling capabilities (e.g., mobile phone, smart phone, tablet, etc.). In other embodiments, the mobile device 120 may be a computing device with access to the network 140, such as a desktop or laptop computer or server. In general, the mobile device 120 may refer to devices that themselves are not mobile but that have access to a mobile calling network, such as a cellular or other wireless network, through a calling software. For instance, a server placing automated robo-calls may be considered a mobile device within the scope of this description.

The mobile device 120 may communicate with the EUDCIC system 110 and/or the mobile device 130. The mobile device 120 may include a EUDCIC manager 122 and input/output devices 124. The mobile device 120 may include one or more identification numbers associated with it. The identification number may be one or more any types of identification information for a communication device (e.g., mobile device 120) or/and caller, such as communication address (e.g., Media Access Control (MAC) address, Mobile Equipment Identifier (MEID), Identifier For Advertising (IDFA) for iOS devices, Unique Device Identifier (UDID), Google Advertising ID (AAID) for Android devices etc.), an identifier of a part in the communication device (e.g., IMEI number, subscriber identification module (SIM) tracking number, etc.), and a combination thereof.

Media Access Control (MAC) is a type of identification code assigned to network connected devices. The MAC address of a communication device can be used for diagnosing, tracking and security of the network. Mobile Equipment Identifier (MEID) is also commonly known as an Electric Serial Number (ESN). MEID is a unique 14-digit number that is a unique identifier of a specific cell phone. Identifier For Advertising (IDFA) for iOS devices is a 40-digit sequence of letters and numbers. The IDFA number can be obtained through iTunes or the Apple App Store. Before introduction of iOS 6, a Unique Device Identifier (UDID) was used as a unique identifier. Google Advertising ID (AAID) for Android devices are randomly generated during the first activation of a mobile device and remain permanent for the lifetime of the mobile device unless there is a factory reset. Mobile device users can access their Android IDs via an App on Google Play.

The EUDCIC manager 122 may be a hardware and/or software component configured to facilitate disclosed functions including generation and encryption of an identification code associated with the mobile device 120, decryption and monitoring of a received identification code, and the like. The input/output devices 124 may include hardware and/or software components configured to facilitate telecommunications calls. For example, the input/output devices 124 may include an audio output device, a microphone, and a user interface (e.g., a touch screen).

The telecommunications system 100 may also include a mobile device 130. The mobile device 130 may be similar to the mobile device 120 and include a EUDCIC manager 132 and input/output devices 134. The mobile device 120 and 130 may represent two smartphones on a telecommunications network. It should be understood that a plurality of mobile devices may be on the telecommunications network with functionality to facilitate phone calls between them.

The network 140 may be a local or global network and may include wired and/or wireless components and functionality which enable internal and/or external communication for components of the telecommunications system 100. In some embodiments, the network 140 is a cellular service network for facilitating wireless telecommunications. In other embodiments, the network 140 may be embodied by the Internet, provided at least in part via cloud services, and/or may include one or more communication devices or systems which enable data transfer to and from the systems and components of the telecommunications system 100.

Figure 2:
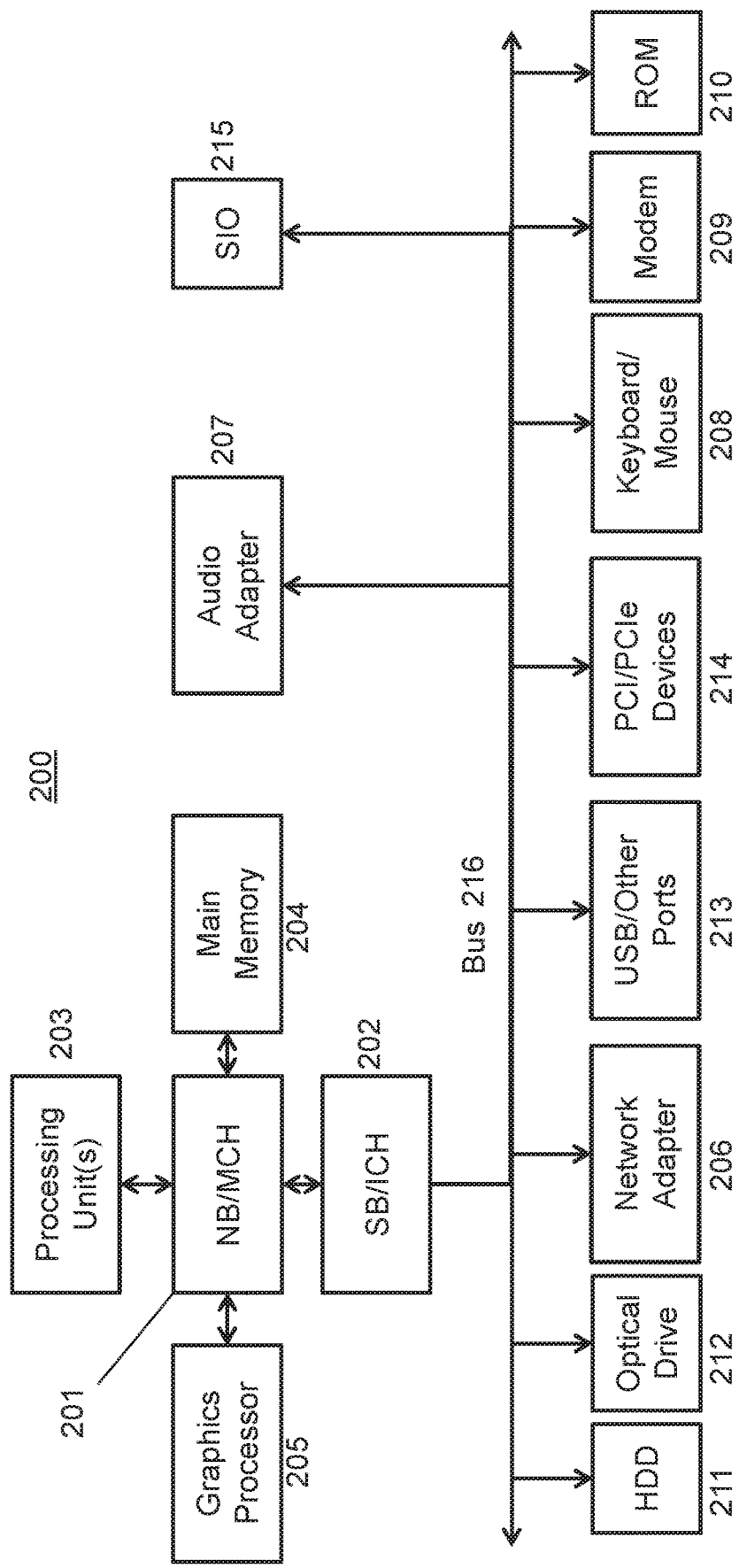
FIG. 2 depicts a block diagram of an example data processing system in which aspect of the illustrative embodiments may be implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG. 2 represents the EUDCIC system 110, which implements at least some of the aspects of the telecommunications system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p running the Advanced Interactive Executive operating system or the LINUX® operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the web site navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the EUDCIC system 110, the mobile device 120, and/or the mobile device 130. However, it should be understood that the EUDCIC system 110, mobile device 120, and/or mobile device 130 may include one or more of the components and configurations of the data processing system 200 for performing processing methods and steps in accordance with the disclosed embodiments.

Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
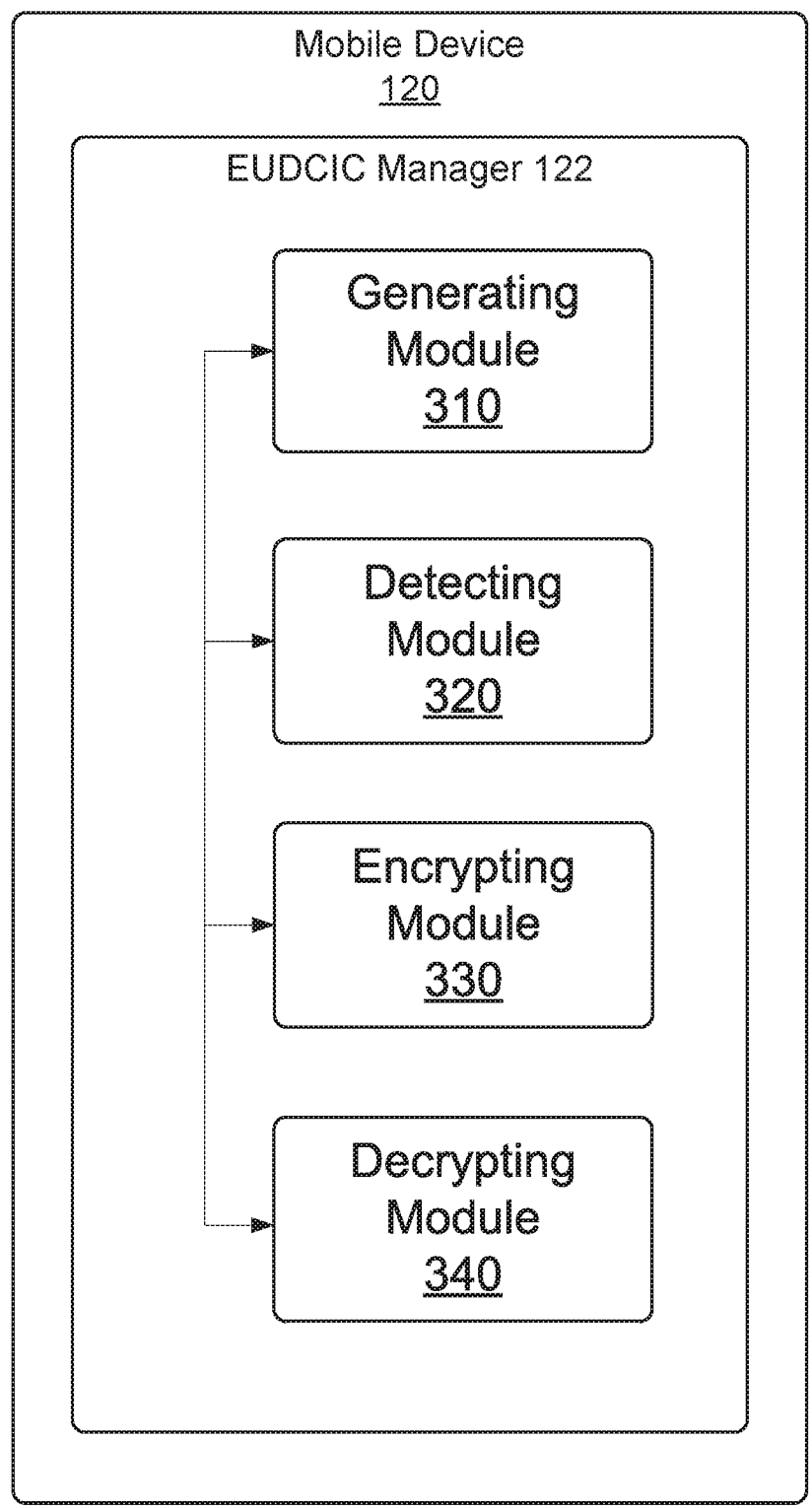
FIG. 3 depicts a block diagram of an exemplary mobile device that may be used in conjunction with the disclosed telecommunications system, consistent with disclosed embodiments.

FIG. 3 is a block diagram of an exemplary mobile device 120 and the EUDCIC manager 122. The EUDCIC manager 122 may comprise, for example, a generating module 310, a detecting module 320, an encrypting module 330, and a decrypting module 340. The modules 310-340 may be configured to provide EUDCIC functions, such as facilitating the transfer of an identification code between user devices 120, 130 via an inaudible signal (the inaudible signal being ultrasonic or infrasonic such that it is out of the range of human hearing. These modules 310-340 may be embodied by hardware and/or software and may be combined, separated into additional modules, or a combination of these. For example, the modules 310-340 may be a suite of software engines stored in a memory device and configured to be executed by a hardware processor for providing one or more functions disclosed herein.

The generating module 310 may be configured to embed an identification code in an inaudible signal. The identification code may be, for example, an IMEI code, a MAC address, a SIM tracking number, or another code associated with a mobile device. The generating module 310 may be configured to generate an inaudible signal that includes the identification code and provide the inaudible signal to another component of the EUDCIC manager 122, such as the encrypting module 330.

The detecting module 320 may be configured to detect an identification code embedded in an inaudible signal, such as a signal received from another mobile device during a call. The detecting module 320 may be configured to detect that a signal from another mobile device (e.g., with an audible portion) includes an ultrasonic portion and provide the ultrasonic portion to another component of the EUDCIC manager, such as the decrypting module 340. In some embodiments, the detecting module 320 may additionally or alternatively be configured to perform steps of a process to determine information associated with a received identification code. For example, the detecting module 320 may consult a lookup table or communicate with the EUDCIC system 110 to determine a user (e.g., caller) associated with an identification received via an inaudible signal during a call.

The encrypting module 330 is configured to encrypt an identification code from the generating module 310 into an inaudible signal. For example, the encrypting module 330 may be a signal generator configured to determine a waveform that can be transmitted via network 140 (e.g., via cellular communication). In one embodiment, the inaudible signal may have a frequency of greater than approximately 20 kHz such that the signal is in the ultrasonic range. In some embodiments, to further ensure that no inaudible signal is audible when transmitted to a mobile device, the frequency of the encrypted inaudible signal may be greater than approximately 24 kHz In another embodiment, the inaudible signal may have a frequency less than 20 Hz such that the signal is in the infrasonic range. The encrypting module 330 may be configured to merge the inaudible signal with an audible signal produced by the mobile device 120. For example, the encrypting module 330 may be configured to combine the inaudible signal with an audio signal that contains speech from a user during the call.

The decrypting module 340 is configured to decrypt an identification code embedded in an inaudible signal. For example, the decrypting module 340 may be configured to determine an identification code that is associated with a sending mobile device through analysis of a received inaudible signal during a call with the sending mobile device. In some embodiments, the decrypting module 340 may be configured to separate an audible signal (e.g., the caller's voice) from the ultrasonic portion. The decrypting module 340 may be a mechanism in the EUDCIC manager 122 for detecting an inaudible signal portion, decrypting the signal, and forwarding the decrypted result to the detecting module 320.

Figure 4:
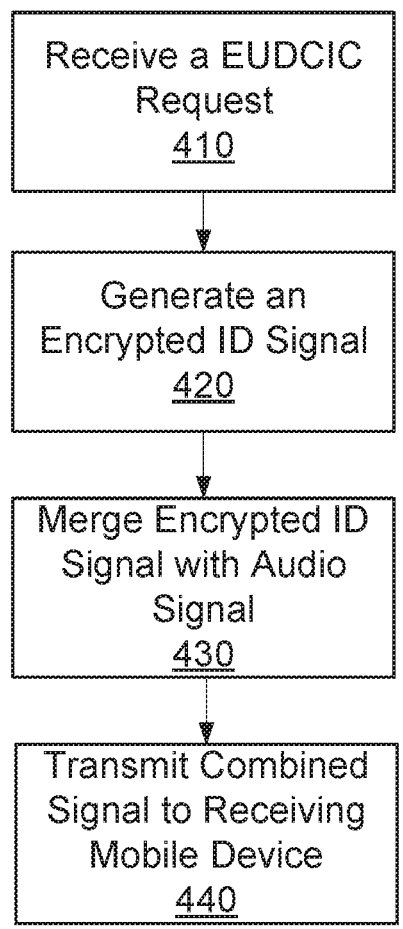
FIG. 4 depicts a flow chart of an exemplary method generating and sending an identification code via an inaudible signal, consistent with disclosed embodiments.

FIG. 4 is a flow chart of an exemplary process 400 for transmitting an identification code via a mobile device, such as mobile device 120. The EUDCIC manager 122 may perform one or more steps of the process 400 to transmit an identification code as part of a typical telecommunications call, such as a phone call to the mobile device 130 via the network 140.

In step 410, the mobile device 120 may receive a EUDCIC request from an internal component of the mobile device 120. For example, the EUDCIC manager may be configured with a EUDCIC scheme that attaches an inaudible signal to all outgoing audible signals made via network 140. In other embodiments, the EUDCIC manager 122 may determine that a call is being placed and provide instructions to the generating module 310.

In step 420, the generating module 310 may generate an encrypted ID signal. For example, the generating module 310 may collect identification information and generate an identification code to be transmitted as part of a phone call. The identification information may include a group of potential identification numbers or other stored data (e.g., time, date, location, status, etc.) associated with the mobile device 120. The generating module 310 may select one of the identification codes, combine one or more identification codes or other data into a EUDCIC, or perform other process to transform data into information to be embedded in a phone call. The generating module 310 may work in conjunction with the encrypting module 330 to produce an ultrasonic waveform that includes the selected identification code, such as the IMEI number, MAC address, or SIM tracking number associated with the mobile device 120. The ultrasonic waveform may have a frequency of greater than at least 20 kHz, or in some embodiments, greater than 24 kHz such that it is not in the audible spectrum. The embodiments are not limited to these frequencies, instead these are examples of ranges that may be useful for embedding information without altering the audible portion of a signal. In some embodiments, the generating module 310 may select an appropriate frequency for the inaudible signal.

In step 430, the mobile device 120 is configured to merge the encrypted ID signal with an audio signal. For example, the generating module 310 and/or encryption module 330 may provide the ultrasonic waveform to a communications component of the mobile device 120 for being included as part of an outgoing signal via the network 140 (e.g., via cellular communications). In step 440, the mobile device 120 is configured to transmit the combined signal to a receiving mobile device, such as mobile device 130.

Figure 5:
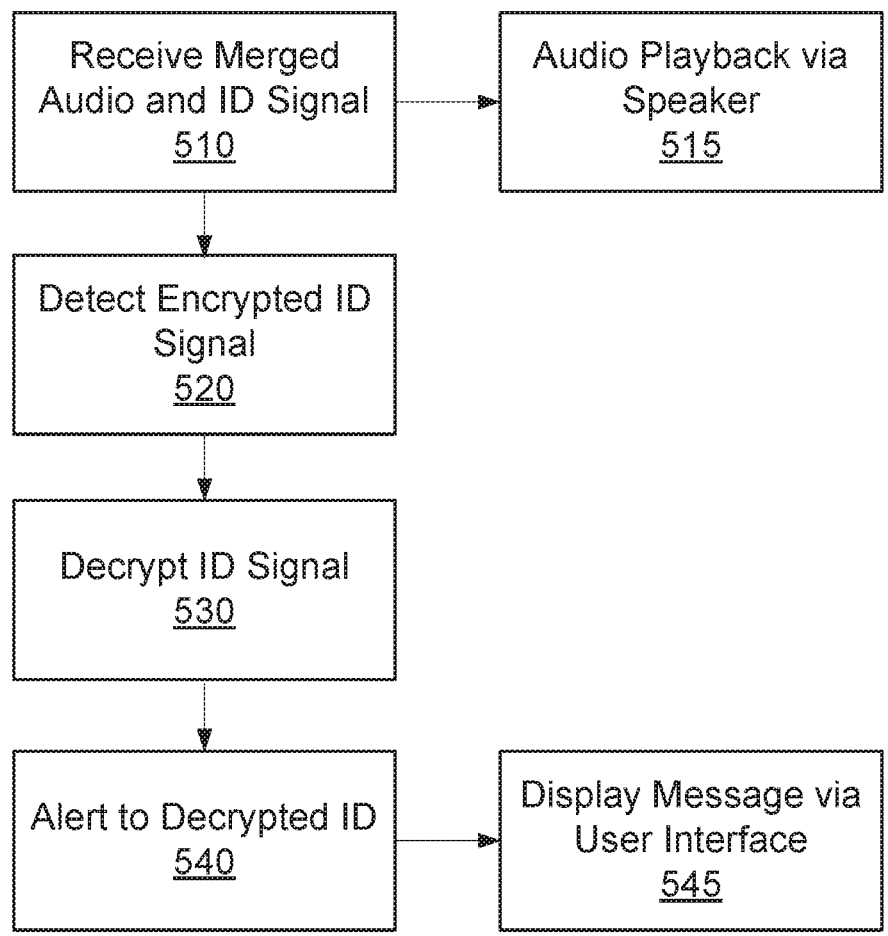
FIG. 5 depicts a flow chart of an exemplary method of receiving and using an identification code via an inaudible signal, consistent with disclosed embodiments.

FIG. 5 is a flow chart of an exemplary process 500 for alerting to a received identification code via an inaudible signal in a EUDCIC scheme. For example, the mobile device 120 may perform the process 500 when receiving a call from another device, such as the mobile device 130. The mobile device 130 may have performed the process 400 before calling the mobile device 120. The EUDCIC manager 122 may perform one or more steps of the process 500. It should be understood that the EUDCIC manager 132 (or the EUDCIC manager of other sending mobile devices) may similarly perform the steps of the process 500 when itself receiving a call according to a EUDCIC scheme.

In step 510, the mobile device 120 receives a merged audio and ID signal. For example, the mobile device 120 may receive a call placed over the network 140 and receive a signal via a wireless cellular connection. The signal may include an audible portion and an ultrasonic portion, with the audible portion being a signal picked up by a microphone associated with the sending mobile device and an ultrasonic portion including an embedded identification code identifying the sending mobile device. In some embodiments, the mobile device 120 may separate or divide the received signal into the audible portion and the ultrasonic portion. The EUDCIC manager 122 may receive the ultrasonic portion. The mobile device 120 may provide at least the audible portion to a speaker associated with the mobile device 120 for audio playback in step 515.

In step 520, the EUDCIC manager 122 is configured to detect an encrypted ID signal in the received signal from the sending mobile device. For example, the detecting module 320 may determine that there is an ultrasonic portion to a received signal. In other embodiments, the EUDCIC manager 122 may receive a notice that an inaudible signal was received. The detecting module 320 (or other component of the mobile device 120) may deliver the inaudible signal to the decrypting module 340.

In step 530, the EUDCIC manager 122 is configured to decrypt the ID signal. For example, the decrypting module 340 may decrypt the ID signal to determine an identification number (IMEI number, MAC address, SIM tracking number, etc.) associated with the sending mobile device (e.g., mobile device 130).

In step 540, the EUDCIC manager 122 may alert to the decrypted ID. For example, the decrypting module 340 may deliver the decrypted identification number to another component, such as the detection module 320, or, in some embodiments, to the EUDCIC system 110. In some embodiments, the detection module 320 may receive the decrypted identification number and determine a user or entity associated therewith. For example, the detection module 320 may determine that the user of mobile device 120 has previously marked the sending mobile device as being associated with a telemarketing call and generate an alert to convey that information. In step 545, the mobile device 120 may display a message via a user interface to convey the alert to a user of the mobile device 120. In other embodiments, the EUDCIC manager 122 may alert to the decrypted identification number by providing the decrypted identification number to another device, such as the EUDCIC system 110. The EUDCIC system 110 may return information associated with the identification number to the mobile device 120, which may display an appropriate message via the user interface in step 545.

The processes 400 and 500 provide an exemplary method for two mobile devices to conduct a typical mobile phone call while transmitting and receiving identification codes associated with the mobile devices such information about the other device can be determined by each device in the call. In some embodiments, the mobile devices 120, 130 may both be similarly configured with EUDCIC managers 122, 132 to exchange identification numbers embedded in inaudible signals appended to audible signals being wirelessly transmitted and received during the call. While both devices may be similarly configured, in some embodiments, only the calling device (e.g., the mobile device initiating the call) will transmit an embedded identification number, such as to protect the privacy of the user merely receiving a call and not taking the action to place a call. In some embodiments, the mobile devices 120, 130 may store information that may be used to identify a calling entity on the basis of the received identification number. For instance, the mobile devices 120, 130 may store an updated database of users, identification codes, and status information, such as known telemarketing or fraudulent callers. In other embodiments, the mobile devices 120, 130 may be configured to work in conjunction with the EUDCIC system 110 to find out more information related to a decrypted identification number.

Figure 6:
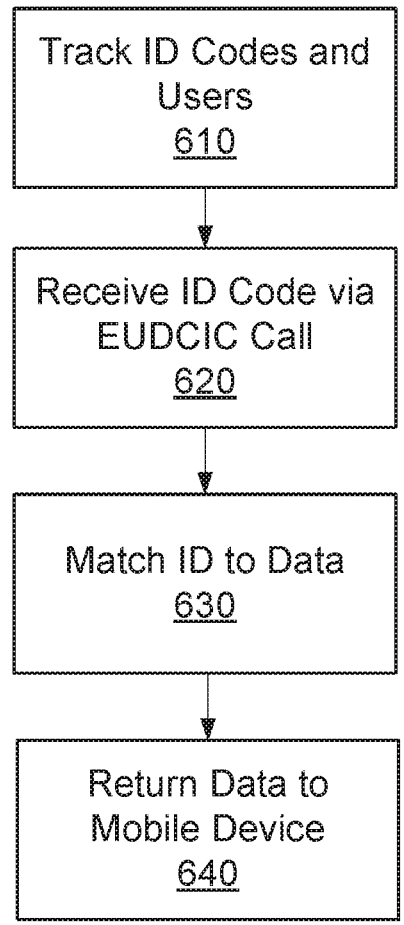
FIG. 6 depicts a flow chart of an exemplary method of tracking information via identification codes embedded in an inaudible signals, consistent with disclosed embodiments.

FIG. 6 is a flow chart of an exemplary process 600 for providing an exemplary application of the transmission of user identification codes in conjunction with the EUDCIC system 110. The EUDCIC system 110 may be a third-party device or telecommunications device configured to connected identification codes associated with mobile devices with useful information, such as identity, locations, and other status information. The EUDCIC system 110 may perform one or more steps of the process 600 in order to provide useful information to a mobile device (e.g., mobile device 120, 130) as a result of a call that results in an identification code being transmitted as an inaudible signal. In some embodiments, the EUDCIC system 110 and/or one or more components thereof are components of a mobile device, such as the EUDCIC manager 122 of the mobile device 120, such that the mobile device 120 can perform the disclosed processes without communicating with a separate component (e.g., a separate EUDCIC system 110).

In step 610, the EUDCIC system 110 tracks identification codes and users. For example, the tracking module 114 may be configured to store identification numbers and associated information, such as the identity of users, businesses, accounts, etc., associated with those numbers. For example, the tracking system 114 may store user accounts and IMEI numbers associated with devices connected to those accounts. In another example, the tracking module 114 may keep track of lost or stolen devices and identification numbers associated with those mobile devices (e.g., IMEI number, MAC address, SIM tracking number, etc.).

In step 620, the EUDCIC system 110 receives an ID code as a result of a EUDCIC call. For example, the call module 112 may receive a notification that a call between mobile device 120 and mobile device 130 is occurring or occurred and mobile device 120 received and decrypted an identification number from the mobile device 130. In some embodiments, the call module 112 may receive a notification from the mobile device 120 with the decrypted identification number. In other embodiments, the call module 112 may receive an encrypted inaudible signal with the identification number embedded.

In step 630, the EUDCIC system 110 matches the received ID code to a mobile device. For example, the tracking module 114 may match the ID code to known information, such as the identity of a user, whether the user is suspicious entity, whether the code is associated with a lost or stolen device, whether the ID code is blacklisted, whether there is phone cloning (e.g., duplicated ID code, illegally copied MAC or/and MEID), etc.

In some embodiments, the EUDCIC system 110 is configured to determine a location associated with a received identification number. For example, the locating module 116 may use the identification number to determine a location through a locating process. The locating module 116 may, for example, use a received IMEI number to determine an approximate location of a device through a known IMEI locating service. In another example, the locating module 116 may perform GPS analysis to determine a location associated with a received identification code.

In step 640, the EUDCIC system 110 returns matched information to the mobile device. For example, the call module 112 may provide determined information to the mobile device 120. The information may be a message indicating that the identification code is associated with a telemarketing or fraudulent entity, whether the device is noted as lost or stolen, whether the call is generated by a computer program (e.g., "This call actually was generated from a computer with MAC 1234.AEDF 9876.EEEE, the indicated caller's number is virtual/fake telephone number"), or other message. The mobile device 120 may receive the message and display an alert to the user via a user interface.

Figure 7:
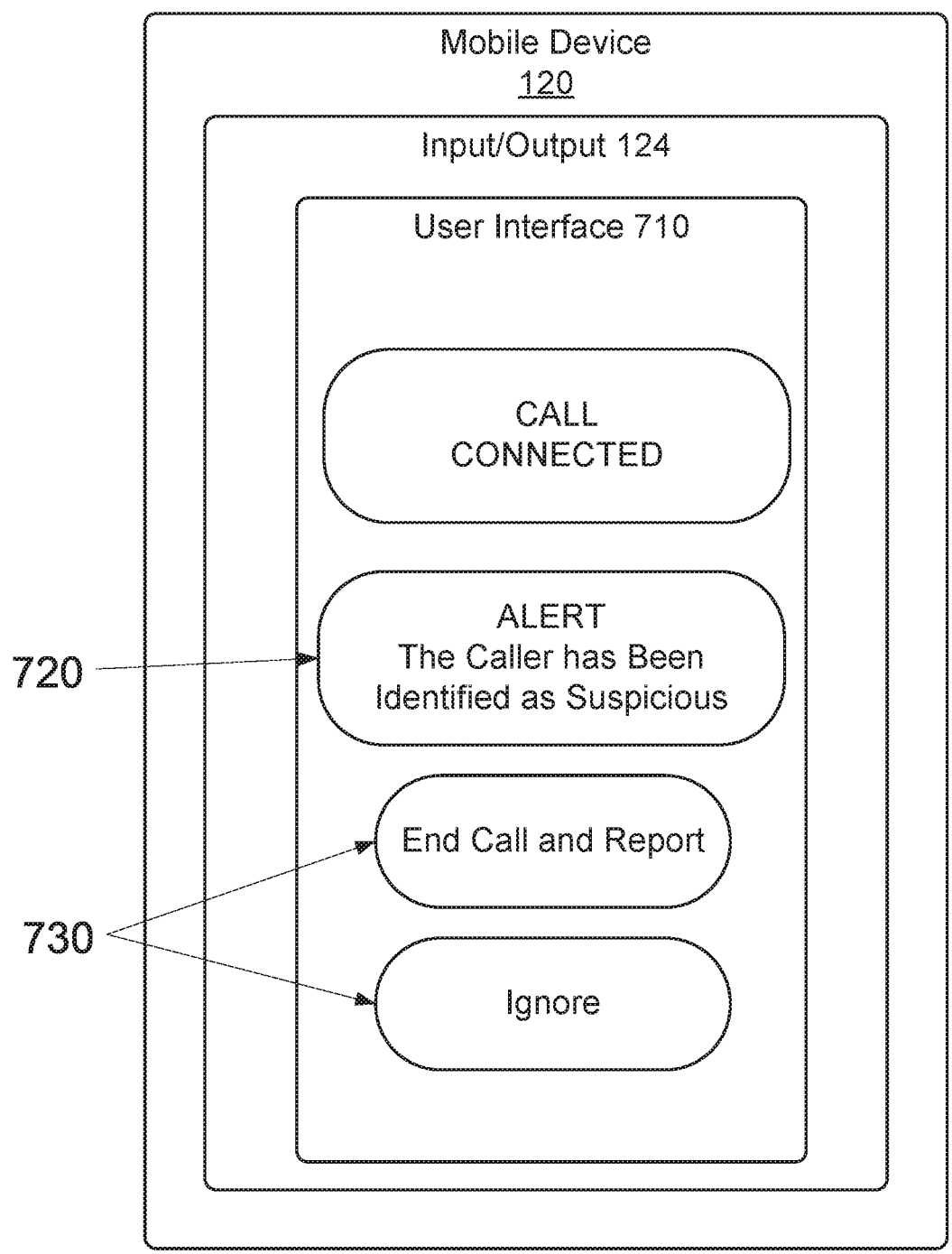
FIG. 7 depicts an exemplary user interface of a mobile device during a call having an embedded identification code, consistent with disclosed embodiments.

FIG. 7 is an example of a user interface 710 that may be displayed to a user via the input/output devices 124 on the mobile device 120. For example, the mobile device 120 may produce the user interface 710 during or after a call with another device, such as when a call is received from the mobile device 130. The user interface 710 includes an alert 720 based on a result of an EUDCIC scheme in which an identification number is received via an inaudible signal and the identification number is determined to be suspicious. For example, the alert 720 can be provided as follows: the identification number may be associated with a fraudulent entity or a lost or stolen device, the call may be generated from a computer program, the call may be a scam call, the caller has called more than 100 people in last one hour, duplicated MEID, and etc. In some embodiments, the user interface 710 may further include interactive options 730 for the user to potentially select based on the alert 720. For example, the user may select to end the call and report the call (e.g., to the EUDCIC system 110) or to ignore the alert.

The present disclosure describes an approach to embedding information in a cellular phone call in order to provide additional information about the devices and or users in the call. The disclosed embodiments include an inaudible signal generation mechanism for using an inaudible signal to embed the additional information in the transmitted signal. The disclosed embodiments may be applicable to a variety of uses in which it is advantageous to understand more about where a call is coming from and whether anything is known about the device being used in the call.

In one example, a service provider (e.g., a telecommunications company) may provide a phone tracking service (e.g., as a software implementation) as a feature to a cellular service plan. The service provider (e.g., via EUDCIC system 110) may track the transmission of an identification code and provide feedback regarding calls that are placed and received, whether the phone has been stolen or lost, etc. The service provide may track one of the identification codes mentioned herein (e.g., IMEI or MEID), or may generate a new, unique code for each device on their network for the purposes of this service.

In another example, an entity (e.g., phone manufacturers) may provide a hardware solution as a feature embedded into a manufactured device. For instance, a component such as an EUDCIC chip, may be added or integrated into manufactured devices (e.g., smart phones) for providing one or more identification code embedding functions consistent with the disclosed embodiments.

In some embodiments, the discloses system may further include a managed repository/database to store all traced/reported decoded identification codes. For instance, the tracking module of the disclosed EUDCIC system may maintain a list of identification codes and associated information (e.g., users) to assist mobile devices in identifying a call. In some implementations, a third party provider may manage a EUDCIC system associated with the repository/database and provide a third party application (e.g., mobile app) with monitoring and matching services. In some embodiments, such a feature could be provided as a cloud Software-as-a-Service (SaaS) feature, pay-as-you-go feature, etc.

Similarly, in some embodiments, a mobile device may store decoded ultrasonic information (e.g., identification codes) and save them locally and/or send them to other devices (e.g., a EUDCIC system or other mobile devices). For instance, a user may provide input that a call is associated with an attempted scam, telemarketing, etc. and share the information with other devices to help prevent others from becoming victim to the same incoming calls.

The disclosed embodiments may also be expanded to a "Do Not Call" list with real-time storage updates. In one example, a user may sign-up for a "Do Not Call" service to filter incoming calls automatically based on the receipt of an embedded identification number.

Further examples may also implement a cognitive solution to monitor decoded information (e.g., identification codes) and identify patterns based on additional information (e.g., similar call times, sources, routing, ID codes, etc.) to determine whether a call is suspicious and/or should trigger an alert. For instance, a mobile device or connected EUDCIC system may implement an AI software application for matching the patterns in similar calls in a database to help prevent the call receiver from engaging in an unwanted call (e.g., interrupt the call to notify the user, disconnect the call, etc.).

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for transmitting an identification code in a telecommunications system via a data processing system in a mobile device connected to a wireless network, the mobile device comprising a processor and a memory comprising instructions which are executed by the processor, the method comprising:

collecting identification information of the mobile device, the identification information including a group of potential identification codes and additional information, wherein the additional information includes time, date, location associated with the mobile device, and status associated with the mobile device;

selecting an identification code from the group of potential identification codes based on the identification information;

combining the selected identification code with the additional information to form a new identification code;

encrypting the new identification code generating an inaudible signal for the encrypted new identification code, the inaudible signal being ultrasonic or infrasonic;

initiating a phone call between the mobile device and a receiving mobile device;

receiving an audible signal comprising speech from a user during a conversation over the phone call;

merging the inaudible signal with the audible signal generated during the conversation to produce a combined signal;

transmitting the combined signal from the mobile device to the receiving mobile device via the wireless network during the phone call;

decrypting the combined signal from the mobile device by the receiving mobile device during the phone call to determine the identification code; and providing an alert to the receiving mobile device about the mobile device based on the identification code during the phone call;

wherein the alert is configured to indicate to the receiving mobile device whether the mobile device is suspicious or authenticated.

2. The method of claim 1, wherein the group of potential identification codes includes an address of the mobile device, an identifier of a part in the mobile device, and a combination thereof.

3. The method of claim 2, wherein the identification code is one or more of an International Mobile Equipment Identity (IMEI) number, a Media Access Control (MAC) address, a Mobile Equipment Identifier (MEID), an Identifier For Advertising (IDFA) number a Unique Device Identifier (UDID) number, a Google Advertising ID (AAID) number, and a subscriber identification module (SIM) tracking number.

4. A computer-implemented method for transmitting an identification code in a telecommunications system via a data processing system in a mobile device connected to a wireless network, the mobile device comprising a processor and a memory comprising instructions which are executed by the processor, the method comprising:

connecting a phone call between the mobile device and a sending mobile device;

receiving a combined signal from the sending mobile device, wherein the combined signal comprising an audible signal and an encrypted inaudible signal, wherein the audible signal comprises speech from a user during a conversation over the phone call, the inaudible signal being ultrasonic or infrasonic;

decrypting the encrypted inaudible signal to determine the identification code, embedded in the encrypted inaudible signal, wherein the identification code includes time, date, location associated with the sending mobile device, and status associated with the sending mobile device; and providing an alert to the mobile device based on the identification code from the sending mobile device during the phone call;

wherein the alert is configured to indicate to the mobile device whether the sending mobile device is suspicious or authenticated.

5. The method of claim 4, further comprising playing the audible signal via a speaker associated with the mobile device.

6. The method of claim 4, wherein the identification code is selected from the group consisting of an address of the sending mobile device, an identifier of a part in the sending mobile device, and a combination thereof.

7. The method of claim 6, wherein the identification code is one or more of an IMEI number, MAC address, or SIM tracking number.

8. The method of claim 4, wherein providing the alert comprises determining information associated with the identification code.

9. The method of claim 8, wherein the alert includes an identity, location, or status associated with the sending mobile device.

10. The method of claim 4, wherein providing the alert comprises transmitting the identification code and receiving data associated with the identification code.

11. The method of claim 10, wherein the data indicates whether the sending mobile device is suspicious or authenticated.

12. A mobile device configured to connect to a wireless network to conduct a phone call with a receiving mobile device, the mobile device comprising:

an Embedded Ultrasound Device Calling Identification Code (EUDCIC) manager comprising:

a detecting module configured to detect a received identification number encrypted in a received inaudible signal of a received combined signal from the receiving mobile device, the received combined signal comprising speech from a user during a conversation over the phone call and the received inaudible signal, the received inaudible signal being ultrasonic or infrasonic, a decrypting module configured to decrypt the received identification number encrypted in the received inaudible signal of the received combined signal to identify the receiving mobile device, and an alerting module configured to provide an alert to the EUDCIC manager based on a decrypted received identification number; and input/output devices for facilitating the phone call, comprising a microphone, a speaker, and a user interface, wherein the received identification number includes time, date, location associated with a sending mobile device, and status associated with the sending mobile device, wherein the EUDCIC manager is configured to display the alert via the user interface based on the decrypted received identification number during the phone call, and wherein the alert is configured to indicate to the receiving mobile device whether the sending mobile device is suspicious or authenticated.

13. The mobile device of claim 12, wherein the EUDCIC manager is configured to select an outgoing identification number associated with the mobile device.

14. The mobile device of claim 13, wherein the EUDCIC manager comprises a generating module configured to generate the received inaudible signal and wherein an encrypting module is configured to merge the received inaudible signal with an outgoing audible signal.

* * * * *